US012706423B2

(12) United States Patent
Long et al.

(10) Patent No.: US 12,706,423 B2
(45) Date of Patent: Aug. 11, 2026

(54) RECEPTACLE CAGE HAVING EMI SHIELDING

(71) Applicant: TE Connectivity Solutions GmbH, Schaffhausen (CH)

(72) Inventors: Richard James Long, Middletown, PA (US); Freddy R. Galindo Palomino, Middletown, PA (US); Alex Michael Sharf, Middletown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 364 days.

(21) Appl. No.: 18/442,648

(22) Filed: Feb. 15, 2024

(65) Prior Publication Data

US 2025/0266649 A1 Aug. 21, 2025

(51) Int. Cl.
*H01R 13/6594* (2011.01)

(52) U.S. Cl.
CPC ................................ *H01R 13/6594* (2013.01)

(58) Field of Classification Search
CPC ............ H01R 13/6594; H01R 13/6582; H01R 13/6581; H01R 13/745; H05K 9/0032; H05K 9/0015; H05K 9/0016
See application file for complete search history.

(56) References Cited

U.S. PATENT DOCUMENTS

| | | | | |
|---|---|---|---|---|
| 7,455,554 B2 * | 11/2008 | Long | G02B 6/4256 439/607.17 |
| 8,636,544 B1 * | 1/2014 | Briant | H01R 13/514 439/607.25 |
| 2013/0048367 A1 * | 2/2013 | Ljubijankic | H01R 13/6583 174/354 |

* cited by examiner

*Primary Examiner* — Edwin A. Leon

(57) ABSTRACT

A receptacle connector assembly includes a receptacle cage having shielding walls forming a module channel configured to receive a pluggable module. The front end has a port open to the pluggable module to receive the pluggable module. The receptacle connector assembly includes an EMI shield coupled to the receptacle cage at the front end. The EMI shield has a shield member including a base coupled to the shielding wall to electrically connect to the receptacle cage. The shield member includes spring fingers extending from the base to distal ends and including a panel interface configured to engage a panel surrounding the receptacle cage to electrically connect the EMI shield to the panel. The spring fingers have variable heights relative to each other.

22 Claims, 4 Drawing Sheets

RECEPTACLE CAGE HAVING EMI SHIELDING

BACKGROUND OF THE INVENTION

The subject matter herein relates generally to communication systems.

Some communication systems utilize communication connectors to interconnect various components of the system for data communication. Some known communication systems use pluggable modules, such as I/O modules, that are electrically connected to the communication connector. Known communication systems provide electrical shielding, such as in the form of a receptacle cage surrounding or adjacent to the communication connector and the pluggable module to provide electrical shielding. Some receptacle cages provide an EMI shield at the front end of the receptacle cage including EMI springs, which may interface with a panel or other grounding structure. However, the EMI springs may make poor contact with the receptacle cage, such as due to the walls of the receptacle cage bowing outward or distorting when the pluggable modules are inserted into the receptacle cage. This causes inconsistent spring contact to the panel which causes poor EMI shielding and leads to diminished performance.

A need remains for a receptacle cage having improved EMI shielding.

BRIEF DESCRIPTION OF THE INVENTION

In one embodiment, a receptacle connector assembly is provided and includes a receptacle cage that has shielding walls extending between a front end and a rear end of the receptacle cage. The shielding walls form a module channel configured to receive a pluggable module. The front end has a port open to the pluggable module to receive the pluggable module. The receptacle connector assembly includes an EMI shield coupled to the receptacle cage at the front end. The EMI shield has a shield member including a base coupled to at least one of the shielding walls to electrically connect the EMI shield to the receptacle cage. The shield member including spring fingers extending from the base to distal ends, each spring finger including a panel interface configured to engage a panel adjacent the receptacle cage to electrically connect the EMI shield to the panel. The spring fingers have variable heights relative to each other.

In another embodiment, a receptacle connector assembly is provided and includes a receptacle cage that has shielding walls extending between a front end and a rear end of the receptacle cage. The shielding walls form a module channel configured to receive a pluggable module. The front end has a port open to the pluggable module to receive the pluggable module. The receptacle connector assembly includes an EMI shield coupled to the receptacle cage at the front end. The EMI shield has a shield member including a base coupled to the corresponding shielding wall to electrically connect the EMI shield to the receptacle cage. The shield member including spring fingers extending from the base to distal ends, each spring finger including a panel interface configured to engage a panel adjacent the receptacle cage to electrically connect the EMI shield to the panel, each spring finger has a height measured from the corresponding shielding wall to the panel interface, adjacent spring fingers have different heights relative to each other.

In a further embodiment, a receptacle connector assembly is provided and includes a receptacle cage that has shielding walls extending between a front end and a rear end of the receptacle cage. The shielding walls form a module channel configured to receive a pluggable module. The front end has a port open to the pluggable module to receive the pluggable module. The receptacle connector assembly includes an EMI shield coupled to the receptacle cage at the front end. The EMI shield has a shield member including a base coupled to at least one of the shielding walls to electrically connect the EMI shield to the receptacle cage. The shield member including spring fingers, each spring finger has an arc extending between a proximal end at the base and a distal end opposite the proximal end, each spring finger including a panel interface along the arc configured to engage a panel adjacent the receptacle cage to electrically connect the EMI shield to the panel. The spring fingers have different curvature at the corresponding panel interface.

DETAILED DESCRIPTION OF THE INVENTION

Figure 1:
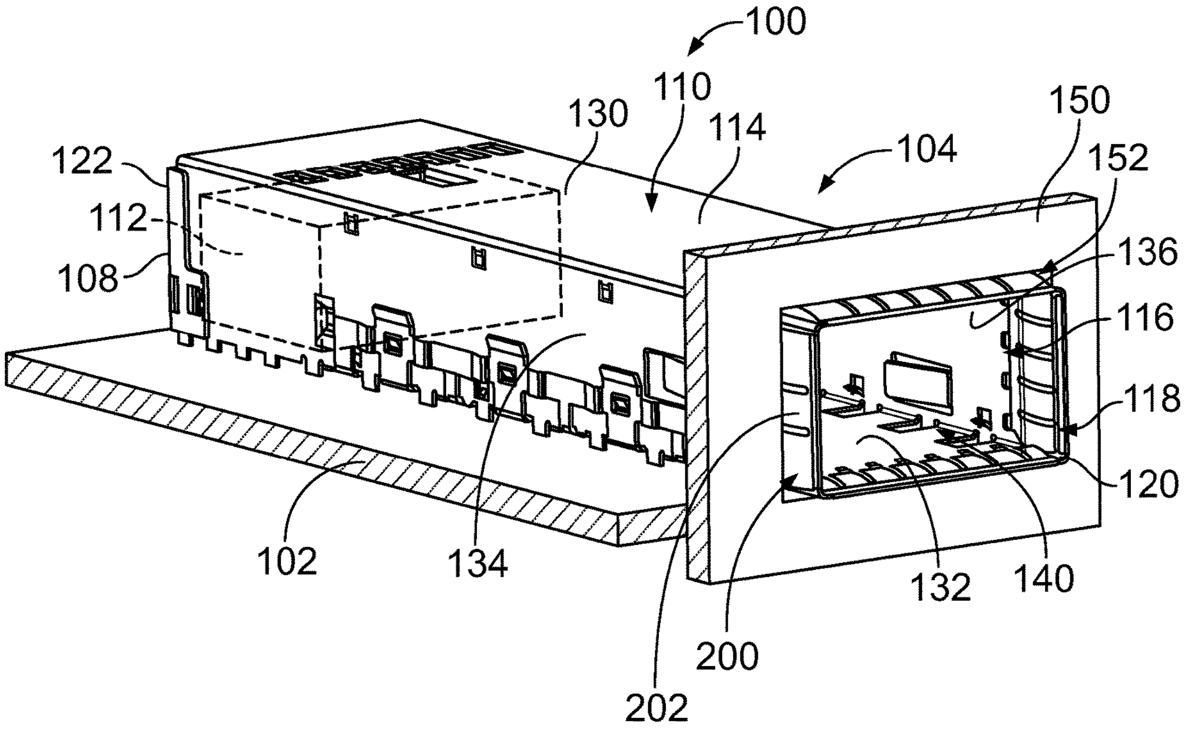
FIG. 1 is a front perspective view of a communication system formed in accordance with an exemplary embodiment.

FIG. 1 is a front perspective view of a communication system 100 formed in accordance with an exemplary embodiment. The communication system 100 includes a host circuit board 102 and a receptacle connector assembly 104 mounted to the host circuit board 102. The receptacle connector assembly 104 is configured to receive a pluggable module 106 (example shown in FIG. 2). The receptacle connector assembly 104 is configured to be electrically connected to the host circuit board 102 by the receptacle connector assembly 104.

In an exemplary embodiment, the receptacle connector assembly 104 includes a receptacle cage 110 and a communication connector 112 (shown in phantom) adjacent the receptacle cage 110. The communication connector 112 may be received in the receptacle cage 110. In other various embodiments, the communication connector 112 may be located rearward of the receptacle cage 110. In various embodiments, the receptacle cage 110 is enclosed and provides electrical shielding for the communication connector 112. In an exemplary embodiment, the receptacle cage 110 is a stamped and formed cage member that includes a plurality of shielding walls 114 that define one or more module channels for receipt of corresponding pluggable modules 106.

In the illustrated embodiment, the receptacle cage 110 is a single port receptacle cage configured to receive a single pluggable module 106. In other various embodiments, the receptacle cage 110 may be a ganged cage member having a plurality of ports ganged together in a single row and/or a stacked cage member having multiple ports stacked as an upper port and a lower port.

The receptacle cage 110 includes a module channel 116 having a module port 118 open to the module channel 116. The module channel 116 receives the pluggable module 106 through the module port 118. In an exemplary embodiment, the receptacle cage 110 extends between a front end 120 and a rear end 122. The module port 118 is provided at the front end 120. Any number of module channels 116 may be provided in various embodiments arranged in a single column or in multiple columns (for example, 2×2, 3×2, 4×2, 4×3, 4×1, 2×1, and the like). Optionally, multiple communication connectors 112 may be arranged within the receptacle cage 110, such as when multiple rows and/or columns of module channels 116 are provided.

In an exemplary embodiment, the shielding walls 114 of the receptacle cage 110 include a first end wall 130, a second end wall 132, a first side wall 134, and a second side wall 136. The side walls 134, 136 extend between the end walls 130, 132. In various embodiments, the first end wall 130 is at a top of the receptacle cage 110, and thus defines a top wall 130, and the second end wall 132 is at a bottom of the receptacle cage 110, and thus defines a bottom wall 132. Other orientations are possible in alternative embodiments, such as the second end wall 132 or one of the side walls 134, 136 defining the top wall. The bottom wall 132 may face, and possibly rest on, the host circuit board 102. In various embodiments, the receptacle cage 110 may be provided without the bottom wall 132. Optionally, the walls 114 of the receptacle cage 110 may include a rear wall 138 at the rear end 122.

The shielding walls 114 define a cavity 140. For example, the cavity 140 may be defined by the first end wall 130, the second end wall 132, the side walls 134, 136 and the rear wall 138. The cavity 140 includes the module channel(s) 116. In various embodiments, the cavity 140 receives the communication connector 112, such as at the rear end 122. Other walls 114 may separate or divide the cavity 140 into additional module channels 116, such as in embodiments using ganged and/or stacked receptacle cages. For example, the walls 114 may include one or more vertical divider walls between ganged module channels 116. In various embodiments, the walls 114 may include a separator panel between stacked upper and lower module channels 116. The separator panel may include an upper panel and a lower panel that form a space between the upper and lower module channels 116, such as for airflow, for a heat sink, for routing light pipes, or for other purposes.

In an exemplary embodiment, the receptacle cage 110 includes an EMI shield 200 at the front end 120 for providing electrical shielding for the module channels 116. For example, the EMI shield 200 may be provided at the port 118 to electrically connect with the pluggable module 106 received in the module channel 116. In an exemplary embodiment, the EMI shield 200 is provided around the exterior of the receptacle cage 110 for interfacing with a panel 150, such as when the front end 120 of the receptacle cage 110 extends through a cutout 152 in the panel 150. The panel 150 may be a grounded component. The panel 150 may be a wall or other structure of a grounded electrical component. The panel 150 may be planar. In various embodiments, the panel 150 is a chassis. The EMI shield 200 may include deflectable features that are configured to be spring biased against the panel 150 to create an electrical connection with the panel 150. The shield members 202 of the EMI shield 200 may extend along the shielding walls 114. The shield members 202 may include spring fingers or other deflectable features that are configured to be spring biased against the pluggable module 106 to create an electrical connection with the pluggable module 106. In an exemplary embodiment, the spring fingers are designed to occupy the space or gap in the cutout 152 around the outside of the receptacle cage 110 to prevent EMI leakage through the cutout 152. The spring fingers may be designed to accommodate different gap lengths along the shielding walls 114, such as when the shielding walls 114 are bowed or askew in the cutout 152. In various embodiments, the shield members 202 are separate and discrete shield members 202 provided on the corresponding shielding walls 114. In other various embodiments, the shield members 202 are integrated as a unitary structure with different segments extending along the corresponding shielding walls 114.

Optionally, the receptacle connector assembly 104 may include one or more heat sinks (not shown) for dissipating heat from the pluggable modules 106. For example, the heat sink may be coupled to the top wall 130 for engaging the pluggable module 106 received in the module channel 116. The heat sink may extend through an opening in the top wall 130 to directly engage the pluggable module 106. Other types of heat sinks may be provided in alternative embodiments.

In an exemplary embodiment, the pluggable modules 106 are loaded through the port 118 at the front end 120 to mate with the communication connector 112. The shielding walls 114 of the receptacle cage 110 provide electrical shielding around the communication connector 112 and the pluggable module 106, such as around the mating interface between the communication connector 112 and the pluggable module 106. The EMI shield may include shield fingers along the interior of the shielding walls 114 configured to interface with the pluggable module 106.

Figure 2:
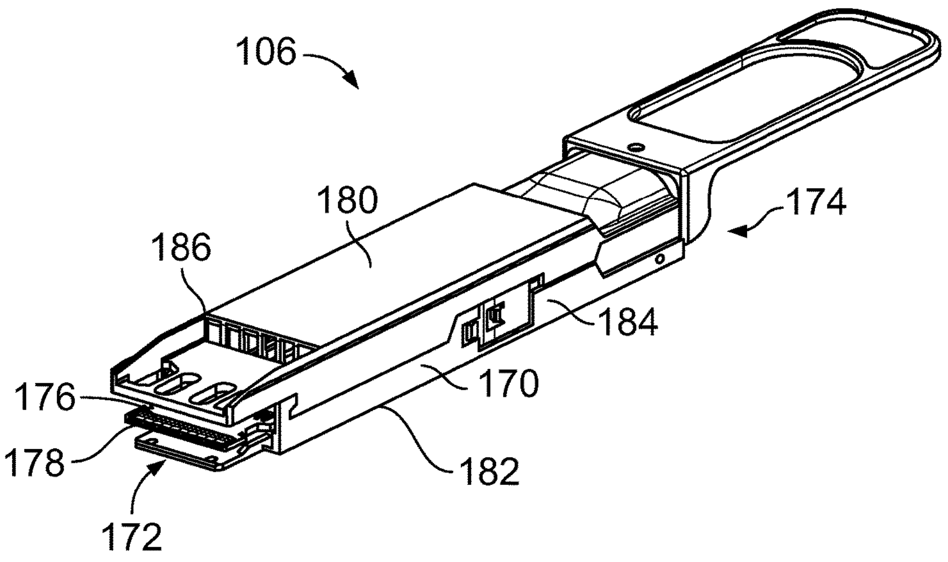
FIG. 2 is a perspective view of the pluggable module in accordance with an exemplary embodiment.

FIG. 2 is a perspective view of the pluggable module 106 in accordance with an exemplary embodiment. The pluggable module 106 has a pluggable body 170, which may be defined by one or more shells. The pluggable body 170 may be thermally conductive and/or may be electrically conductive, such as to provide EMI shielding for the pluggable module 106. The pluggable body 170 includes a mating end 172 and an opposite front end 174. The mating end 172 is configured to be inserted into the corresponding module channel 116 (shown in FIG. 1). The front end 174 may be a cable end having a cable extending therefrom to another component within the system.

The pluggable module 106 includes a connector interface, such as a module circuit board 176, which is configured to be communicatively coupled to the communication connector 112 (shown in FIG. 1). The module circuit board 176 may be accessible at the mating end 172. The module circuit board 176 has a mating edge 178 and mating contacts at the mating edge 178 configured to be mated with the communication connector 112. The module circuit board 176 may include components, circuits and the like used for operating and/or using the pluggable module 106. For example, the module circuit board 176 may have conductors, traces, pads, electronics, sensors, controllers, switches, inputs, outputs, and the like associated with the module circuit board, which may be mounted to the module circuit board 176, to form various circuits. In various embodiments, the pluggable module 106 may be a fiber optic module. The connector interface(s) may include fiber optic cables and/or optical generators to transmit optical signals.

The pluggable module 106 includes an outer perimeter defining an exterior of the pluggable body 170. For example, the outer perimeter may be defined by a top 180, a bottom 182, a first side 184 and a second side 186. The pluggable body 170 may have other shapes in alternative embodiments. The top 180, the bottom 182, the first side 184 and the second side 186 may have flat surfaces, such as to receive the spring fingers of the EMI shield 200 (shown in FIG. 1).

In an exemplary embodiment, the pluggable body 170 provides heat transfer for the module circuit board 176, such as for the electronic components on the module circuit board 176. For example, the module circuit board 176 is in thermal communication with the pluggable body 170 and the pluggable body 170 transfers heat from the module circuit board 176. Optionally, the pluggable body 170 may include a plurality of heat transfer fins (not shown) along at least a portion of the outer perimeter of the pluggable module 106, such as along the top, for dissipating heat from the pluggable body 170. A plate may connect the distal ends of the heat transfer fins to form a planar, flat surface, such as for interfacing with a heat sink.

Figure 3:
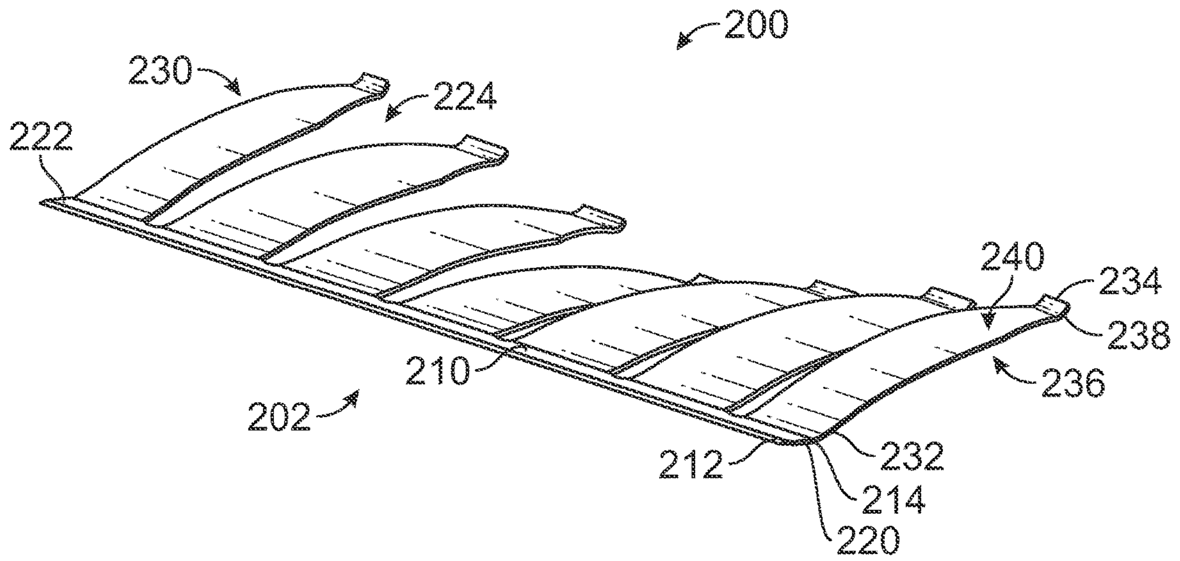
FIG. 3 is a perspective view of a portion of the EMI shield showing one of the shield members or a portion of one of the shield member in accordance with an exemplary embodiment.
Figure 4:
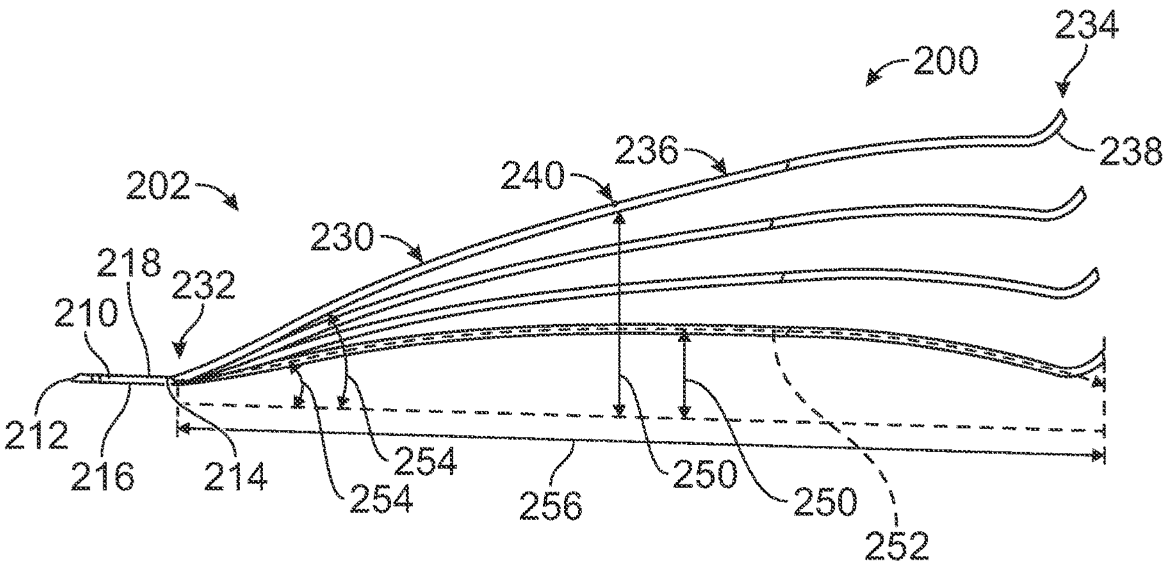
FIG. 4 is a side view of the shield member in accordance with an exemplary embodiment.

FIG. 3 is a perspective view of a portion of the EMI shield 200 showing one of the shield members 202 or a portion of one of the shield member 202 in accordance with an exemplary embodiment. FIG. 4 is a side view of the shield member 202 in accordance with an exemplary embodiment. In an exemplary embodiment, the shield member 202 is a stamped and formed part being stamped from a metal sheet and bent into a predetermined shape. The shield member 202 includes a base 210 and a plurality of spring fingers 230 extending from the base 210. The base 210 is configured to be coupled to the receptacle cage 110. The spring fingers 230 are configured to interface with the panel 150 (shown in FIG. 1).

The base 210 includes a front edge 212 and a rear edge 214. The base 210 includes an inner surface 216 and an outer surface 218. The inner surface 216 is configured to be coupled to the receptacle cage 110. The base 210 extends between a first end 220 and a second end 222 of the shield member 202. Optionally, another shield member 202 may extend from the first end 220 and/or the second end 222, such as perpendicular to the shield member 202 shown in FIG. 3. The base 210 may be generally planar extending along a base plane. The inner and outer surfaces 218 may be planar and parallel to each other. Optionally, the base 210 may be welded to the corresponding shielding wall 114.

In an exemplary embodiment, a plurality of spring fingers 230 are provided along the shield member 202. The spring fingers 230 extend rearward from the rear edge 214. Gaps 224 are provided between the spring fingers 230 to allow the spring fingers 230 to be independently deflectable relative to each other. The spring finger 230 is deflectable, such as when mating to the receptacle cage 110. Each spring finger 230 extends between a proximal end 232 and a distal end 234. The proximal end 232 is provided at the base 210. The spring fingers 230 may be curved between the proximal end 232 and the distal end 234. For example, each spring finger 230 may include an arc 236. The arc 236 follows an arcuate path between the proximal end 232 and the distal end 234. For example, the spring finger 230 may follow a smooth curve between the proximal end 232 and the distal end 234. The curvature may be variable between the proximal end 232 and the distal end 234, such as following a segment of an ellipse. For example, the curvature may be parabolic in shape. In other various embodiments, the curvature may be constant between the proximal end 232 and the distal end 234, such as following a segment of a circle. The arc 236 may follow other curved shapes in alternative embodiments. In an exemplary embodiment, the spring finger 230 includes a foot 238 at the distal end 234. The foot 238 may have a different curvature compared to the arc 236. The foot 238 may be used to support the spring finger 230, such as to support the spring finger 230 on the shielding wall 114. In an exemplary embodiment, the spring finger 230 includes a panel interface 240 along the arc 236. The panel interface 240 is the portion of the spring finger 230 configured to engage the panel 150 when the receptacle cage 110 is received in the cutout 152. In an exemplary embodiment, the panel interface 240 is located remote from the proximal end 232 and remote from the distal end 234. The panel interface 240 may be approximately centered between the proximal end 232 and the distal end 234. The panel interface 240 may be provided at an apex of the arc 236 in various embodiments.

In an exemplary embodiment, the spring fingers 230 have variable heights relative to each other. Each spring finger 230 has a height 250 measured from the shielding wall 114 (for example, the inner surface 216 of the base 210) to the panel interface 240. The panel interfaces 240 of the spring fingers 230 are at different heights 250 (measured from the corresponding shielding wall 114). Some spring fingers are short spring fingers (short height), some spring fingers are tall spring fingers (tall height), and some spring fingers are mid-height spring fingers. In an exemplary embodiment, adjacent spring fingers have different heights relative to each other. Optionally, at least some of the spring fingers 230 may have the same heights. For example, the outer-most spring fingers may have the same height and/or the inner-most spring fingers may have the same height and/or some of the spring fingers in-between may have the same height. Having the spring fingers 230 at different heights allows the spring fingers 230 to fill larger gaps at the edges or corners of the cutout 152 where there is less bowing of the shielding walls 114 and allows the spring fingers to fill smaller gaps in the middle of the shielding walls 114 where there is more bowing when the pluggable module 106 is plugged into the module channel 116.

The spring fingers 230 have lengths 252 measured between the proximal ends 232 and the distal ends 234. In an exemplary embodiment, the spring fingers 230 have the same lengths 252. For example, each spring finger 230 may be stamped identically. In alternative embodiments, the spring fingers 230 may have variable lengths 252 relative to each other. For example, the spring fingers 230 may be stamped to have different lengths 252. For example, the outer-most spring fingers 230 may be the longest and the inner-most spring fingers 230 may be the shortest, or vice-versa. Having the spring fingers 230 at different lengths 252 allows the spring fingers 230 to extend to different heights or have different shapes.

In an exemplary embodiment, the spring fingers 230 are bent between the proximal ends 232 and the distal ends 234 into the arcuate shapes to form the arcs 236. Each spring finger 230 has a launch angle 254 from the base 210. In an exemplary embodiment, the spring fingers 230 extend from the base 210 at different launch angles 254 relative to each other. For example, the outer-most spring fingers 230 may be bent at the steepest launch angle 254 and the inner-most spring fingers 230 may be bent at the shallowest launch angle 254, or vice-versa. In other various embodiments, the spring finger 230 at the first end 220 may be bent at the steepest launch angle 254 and the spring finger 230 at the second end 222 may be bent at the shallowest launch angle 254, or vice-versa, with the spring fingers therebetween stepped at different launch angles 254. Having the spring fingers 230 at different launch angles 254 allows the spring fingers 230 to extend to different heights or have different shapes.

In an exemplary embodiment, the spring fingers 230 are generally formed in the same shapes, but, due to the different launch angles 254, have different heights 250. The curvatures of the arcs 236 may be identical. The distal ends 234 may be at different heights from the shielding wall 114 (or the base plane of the base 210). In other various embodiments, the arcs 236 of the spring fingers 230 may have different curvatures. For example, the spring fingers 230 may have different launch angles 254 and follow different curvatures to the distal ends 234. The spring fingers 230 may have different curvatures (for example, radius of curvature) at the panel interface 240. The spring fingers 230 may have different curvatures at the proximal ends 232. The spring fingers 230 may have different curvatures at the distal ends 234. The spring fingers 230 may have different arc lengths between the proximal ends 232 and the distal ends 234 thereof.

In various embodiments, the distal ends 234 of all of the spring fingers 230 may be located at a distance 256 from the base 210. For example, all of the distal ends 234 may be located at the same distance 256 from the base 210. However, in alternative embodiments, the distal ends 234 may be located at different distances 256 from the base 210. For example, the outer-most spring fingers 230 may be at a closest distance from the base 210 and the inner-most spring fingers 230 may be at a furthest distance from the base 210, or vice-versa. The distance 256 may be based on the length of the spring finger 230, the shape of the curve of the spring finger 230, and the like.

Figure 5:
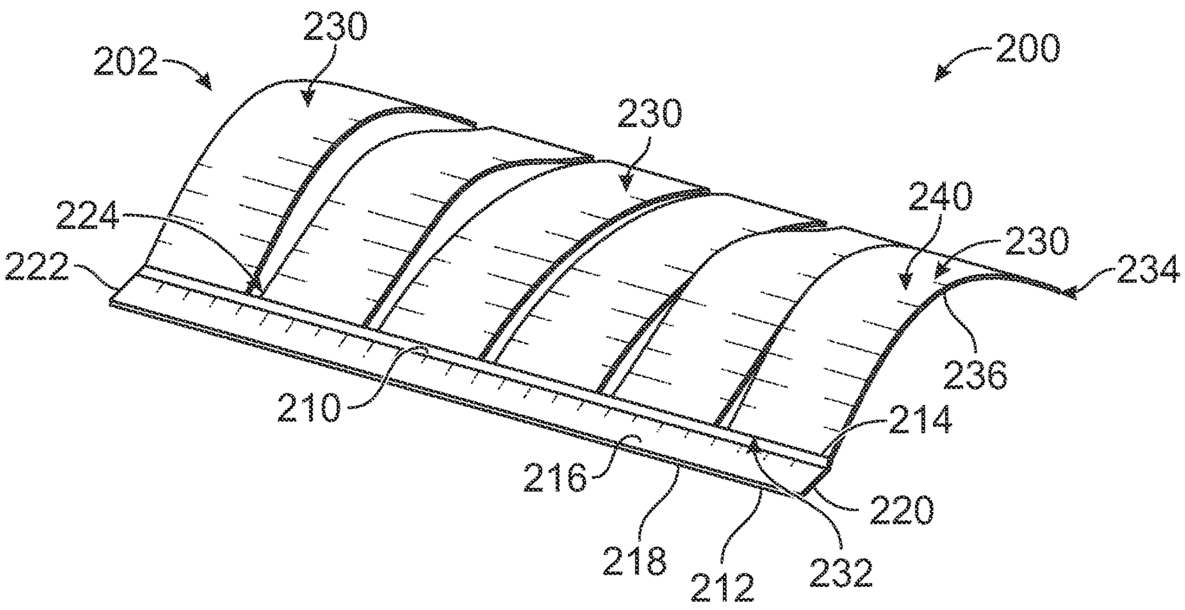
FIG. 5 is a perspective view of a portion of the EMI shield showing one of the shield members or a portion of one of the shield member in accordance with an exemplary embodiment.
Figure 6:
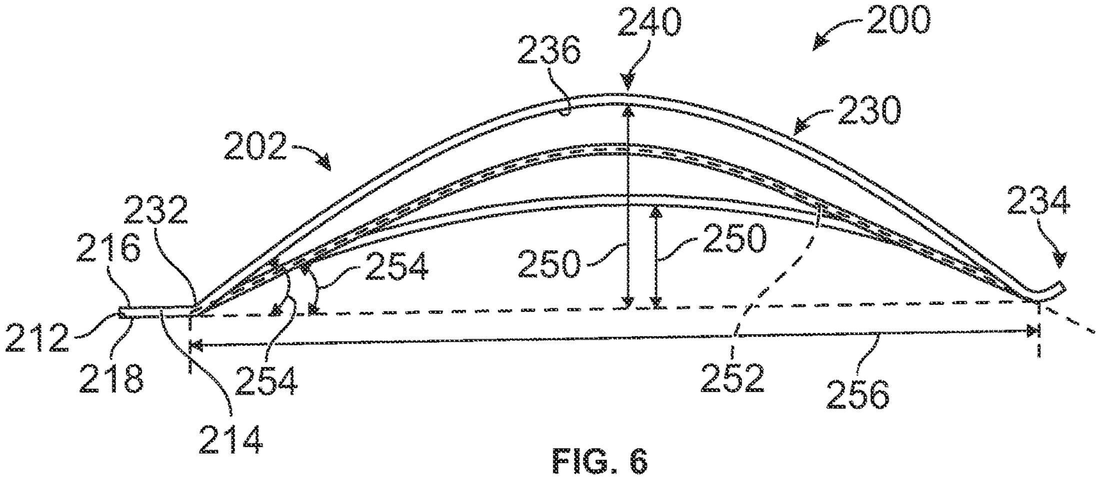
FIG. 6 is a side view of the shield member in accordance with an exemplary embodiment.

FIG. 5 is a perspective view of a portion of the EMI shield 200 showing one of the shield members 202 or a portion of one of the shield member 202 in accordance with an exemplary embodiment. FIG. 6 is a side view of the shield member 202 in accordance with an exemplary embodiment. In an exemplary embodiment, the shield member 202 is a stamped and formed part being stamped from a metal sheet and bent into a predetermined shape. The shield member 202 includes the base 210 and a plurality of the spring fingers 230 extending from the base 210. The base 210 is configured to be coupled to the receptacle cage 110. The spring fingers 230 are configured to interface with the panel 150 (shown in FIG. 1).

The base 210 includes the front edge 212 and the rear edge 214. The base 210 includes the inner surface 216 and the outer surface 218. The inner surface 216 is configured to be coupled to the receptacle cage 110. The base 210 extends between the first end 220 and the second end 222 of the shield member 202. The base 210 connects the array of the spring fingers 230 to hold the spring fingers 230 relative to each other. The gaps 224 are provided between the spring fingers 230 to allow the spring fingers 230 to be independently deflectable relative to each other.

Each spring finger 230 extends between the proximal end 232 and the distal end 234. The proximal end 232 is provided at the base 210. The spring fingers 230 are curved between the proximal end 232 and the distal end 234 along the arc 236. The arc 236 follows an arcuate path between the proximal end 232 and the distal end 234. For example, the spring finger 230 may follow a smooth curve between the proximal end 232 and the distal end 234. The curvature may be variable between the proximal end 232 and the distal end 234, such as following a segment of an ellipse. For example, the curvature may be parabolic in shape. In other various embodiments, the curvature may be constant between the proximal end 232 and the distal end 234, such as following a segment of a circle. The arc 236 may follow other curved shapes in alternative embodiments. The panel interface 240 is located along the arc 236, such as approximately centered between the proximal end 232 and the distal end 234. The panel interface 240 may be provided at an apex of the arc 236 in various embodiments.

In an exemplary embodiment, the spring fingers 230 have variable heights relative to each other. The height 250 is measured from the inner surface 216 of the base 210 (for example, from the shielding wall 114) to the panel interface 240. The panel interfaces 240 of the spring fingers 230 are at different heights 250. In an exemplary embodiment, adjacent spring fingers have different heights relative to each other. Optionally, at least some of the spring fingers 230 may have the same heights. For example, the outer-most spring fingers may have the same height and/or the inner-most spring fingers may have the same height and/or some of the spring fingers in-between may have the same height. In the illustrated embodiment, the outer-most spring fingers 230 are the tallest and the inner-most spring fingers 230 are the shortest. Having the spring fingers 230 at different heights allows the spring fingers 230 to fill larger gaps at the edges or corners of the cutout 152 where there is less bowing of the shielding walls 114 and allows the spring fingers to fill smaller gaps in the middle of the shielding walls 114 where there is more bowing when the pluggable module 106 is plugged into the module channel 116. However, other arrangements are possible in alternative embodiments, such as having the tallest spring fingers 230 at the first end 220 and the shortest spring fingers at the second end 222, or vice-versa.

In the illustrated embodiment, the spring fingers 230 have different lengths 252 measured between the proximal ends 232 and the distal ends 234. The spring fingers 230 may have variable lengths 252 relative to each other. For example, the outer-most spring fingers 230 may be the longest and the inner-most spring fingers 230 may be the shortest, or vice-versa. Having the spring fingers 230 at different lengths 252 allows the spring fingers 230 to extend to different heights or have different shapes. In an exemplary embodiment, the spring fingers 230 extend from the base 210 at different launch angles 254 relative to each other. For example, the outer-most spring fingers 230 may be bent at the steepest launch angle 254 and the inner-most spring fingers 230 may be bent at the shallowest launch angle 254, or vice-versa. Having the spring fingers 230 at different launch angles 254 allows the spring fingers 230 to extend to different heights or have different shapes.

In the illustrated embodiment, the arcs 236 of the spring fingers 230 may have different curvatures. For example, the spring fingers 230 may have different launch angles 254 and follow different curvatures to the distal ends 234. The spring fingers 230 may have different curvatures (for example, radius of curvature) at the panel interface 240. The spring fingers 230 may have different curvatures at the proximal ends 232. The spring fingers 230 may have different curvatures at the distal ends 234. The spring fingers 230 may have different arc lengths between the proximal ends 232 and the distal ends 234 thereof. The different curvatures of the spring fingers 230 allows the spring fingers 230 to extend to different heights and have different shapes.

In the illustrated embodiment, the distal ends 234 of all of the spring fingers 230 are located at the same distance 256 from the base 210. For example, the spring fingers 230 have different arc lengths and different curvatures but still end at a common distance from the base 210. However, in alternative embodiments, the distal ends 234 may be located at different distances 256 from the base 210.

Figure 7:
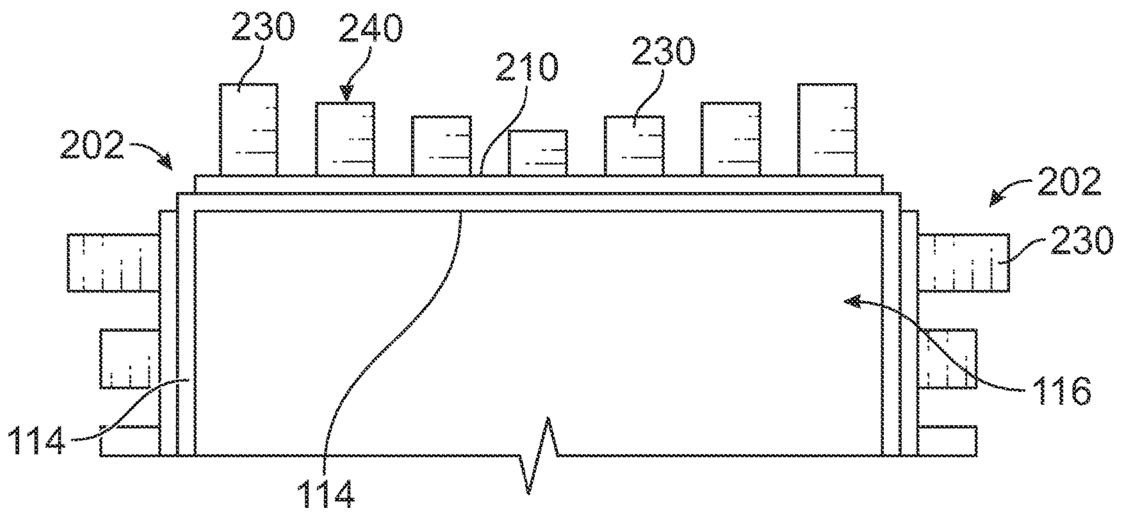
FIG. 7 is a front view of a portion of the communication system showing the shield member mounted to the shielding wall in accordance with an exemplary embodiment.
Figure 8:
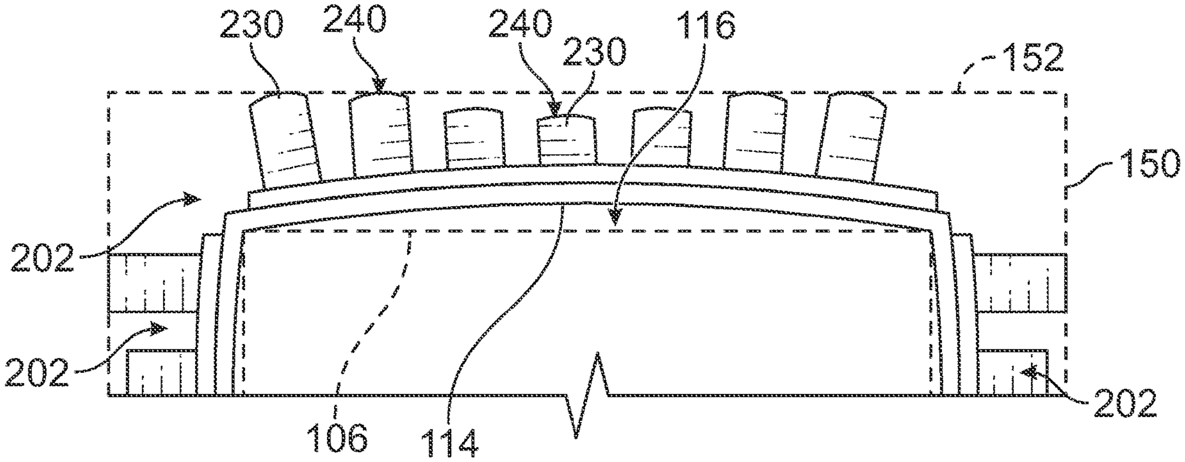
FIG. 8 is a front view of a portion of the communication system showing the shield member mounted to the shielding wall in accordance with an exemplary embodiment.

FIG. 7 is a front view of a portion of the communication system showing the shield member 202 mounted to the shielding wall 114. FIG. 8 is a front view of a portion of the communication system showing the shield member 202 mounted to the shielding wall 114. FIG. 7 shows the shielding wall 114 being planar. FIG. 8 shows the shielding wall 114 being bowed. The shielding wall 114 may bow outward, such as when the pluggable module 106 is loaded into the module channel 116. For example, the central portion of the shielding wall 114 may bow outward, which changes the gap or spacing between the shielding wall 114 and the cutout 152 of the panel 150.

The spring fingers 230 are designed to accommodate the bowed nature of the shielding wall 114. For example, the spring fingers 230 are at different heights to allow the spring fingers 230 to fill larger gaps at the edges or corners of the cutout 152 where there is less bowing of the shielding wall 114 and to allow the spring fingers 230 to fill smaller gaps in the middle of the shielding wall 114 where there is more bowing when the pluggable module 106 is plugged into the module channel 116. FIG. 8 shows how the different height spring fingers 230 are repositioned when the shielding wall 114 is bowed outward. For example, the base 210 is flexed or bowed outward with the shielding wall 114 and thus no longer planar but rather arch shaped. Bowing of the base 210 causes the spring fingers 230 near the central portion to move outward (for example, upward in the orientation shown in FIG. 8), which lifts the panel interfaces 240 of the central spring fingers 230 closer to the panel 150. Optionally, the panel interfaces 240 of all of the spring fingers 230 may be generally coplanar when the shield member 202 is bowed outward with the shielding wall 114.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle connector assembly comprising:

a receptacle cage having shielding walls extending between a front end and a rear end of the receptacle cage, the shielding walls forming a module channel configured to receive a pluggable module, the front end having a port open to the pluggable module to receive the pluggable module; and an EMI shield coupled to the receptacle cage at the front end, the EMI shield having a shield member including a base coupled to at least one of the shielding walls to electrically connect the EMI shield to the receptacle cage, the shield member including spring fingers extending from the base to distal ends, each spring finger including a panel interface configured to engage a panel adjacent the receptacle cage to electrically connect the EMI shield to the panel, the spring fingers having variable heights relative to each other.

2. The receptacle connector assembly of claim 1, wherein the panel interfaces of the spring fingers are at different heights measured from the corresponding shielding wall.

3. The receptacle connector assembly of claim 1, wherein each spring finger has a height measured from the corresponding shielding wall to the panel interface, adjacent spring fingers having different heights relative to each other.

4. The receptacle connector assembly of claim 1, wherein adjacent spring fingers have different heights.

5. The receptacle connector assembly of claim 1, wherein the spring fingers have variable lengths relative to each other.

6. The receptacle connector assembly of claim 1, wherein the spring fingers extend from the base at different launch angles relative to each other.

7. The receptacle connector assembly of claim 1, wherein each spring finger has an arc extending between a proximal end at the base and a distal end opposite the proximal end, the arcs of the spring fingers having different curvatures at the corresponding panel interface.

8. The receptacle connector assembly of claim 7, wherein the spring fingers have different arc lengths between the proximal ends and the distal ends thereof.

9. The receptacle connector assembly of claim 7, wherein the proximal ends of the spring fingers are at different launch angles from the base.

10. The receptacle connector assembly of claim 1, wherein the spring fingers have distal ends, each of the distal ends located a distance from the base.

11. The receptacle connector assembly of claim 1, wherein the spring fingers have distal ends, the distal ends being located at different distances from the base.

12. The receptacle connector assembly of claim 1, wherein the spring fingers have distal ends, the spring fingers having lengths measured between the base and the corresponding distal ends, the spring fingers having variable lengths relative to each other.

13. The receptacle connector assembly of claim 1, wherein the shield member extends between a first end and a second end, a plurality of the spring fingers located between the first end and the second end, the spring fingers located proximate to the first end and the second end being taller than the spring fingers located remote from the first end and the second end.

14. The receptacle connector assembly of claim 1, wherein the shield member extends between a first end and a second end, the spring fingers including a first spring finger proximate to the first end, a second spring finger proximate to the second end, and a third spring finger between the first spring finger in the second spring finger, the third spring finger being shorter than the first spring finger and the second spring finger.

15. A receptacle connector assembly comprising:

a receptacle cage having shielding walls extending between a front end and a rear end of the receptacle cage, the shielding walls forming a module channel configured to receive a pluggable module, the front end having a port open to the pluggable module to receive the pluggable module; and an EMI shield coupled to the receptacle cage at the front end, the EMI shield having a shield member including a base coupled to the corresponding shielding wall to electrically connect the EMI shield to the receptacle cage, the shield member including spring fingers extending from the base to distal ends, each spring finger including a panel interface configured to engage a panel adjacent the receptacle cage to electrically connect the EMI shield to the panel, each spring finger having a height measured from the corresponding shielding wall to the panel interface, adjacent spring fingers having different heights relative to each other.

16. The receptacle connector assembly of claim 15, wherein the base extends along a base plane, the panel interfaces of the spring fingers located at different heights from the base plane.

17. The receptacle connector assembly of claim 15, wherein the base extends along a base plane, the spring fingers extending from the base at different launch angles relative to each other.

18. The receptacle connector assembly of claim 15, wherein the distal ends are at different heights from each other.

19. A receptacle connector assembly comprising:

a receptacle cage having shielding walls extending between a front end and a rear end of the receptacle cage, the shielding walls forming a module channel configured to receive a pluggable module, the front end having a port open to the pluggable module to receive the pluggable module; and an EMI shield coupled to the receptacle cage at the front end, the EMI shield having a shield member including a base coupled to at least one of the shielding walls to electrically connect the EMI shield to the receptacle cage, the shield member including spring fingers, each spring finger having an arc extending between a proximal end at the base and a distal end opposite the proximal end, each spring finger including a panel interface along the arc configured to engage a panel adjacent the receptacle cage to electrically connect the EMI shield to the panel, the spring fingers having different curvature at the corresponding panel interface.

20. The receptacle connector assembly of claim 19, wherein the spring fingers have different arc lengths.

21. The receptacle connector assembly of claim 19, wherein the proximal ends extend from the base at different launch angles relative to each other.

22. The receptacle connector assembly of claim 19, wherein the panel interfaces of the spring fingers are at different heights relative to each other measured from the corresponding shielding wall.

* * * * *